March 30, 1954 — E. W. ASHTON — 2,673,412
EAR TAG
Filed June 30, 1951
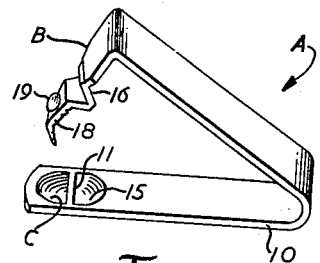
Fig. 1
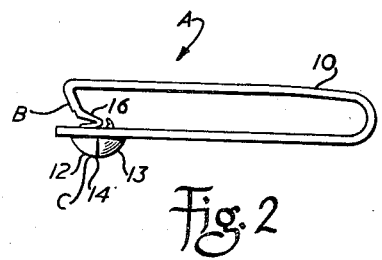
Fig. 2
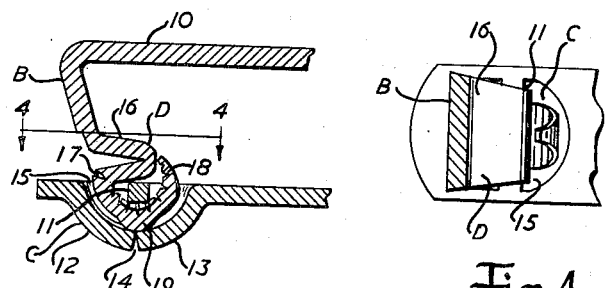
Fig. 3
Fig. 4
Inventor
ERNEST W. ASHTON
by: Fetherstonhaugh & Co.
Attys.

Patented Mar. 30, 1954

2,673,412

UNITED STATES PATENT OFFICE 2,673,412

EAR TAG

Ernest Ward Ashton, Ottawa, Ontario, Canada, assignor to Ketchum Manufacturing Co., Limited, Carleton, Ontario, Canada Application June 30, 1951, Serial No. 234,526

4 Claims. (Cl. 40—3)

This invention relates to tamper-proof ear tags.

In a prior Canadian patent of which I am co-inventor, there is disclosed, a tag formed from a strip of material adapted to be bent upon itself and formed with a tapered locking tongue at one end and with a housing for receiving the locking tongue, wherein the housing has an opening accessible from one side of the strip with an integral locking bar extending across the opening, around which the locking tongue extends when the tag has been clinched. The housing is died from the strip so as to form the integral locking bar and, the slot in the housing left by the material from which the locking bar is formed, is closed to form a completely closed housing on one side of the strip.

The underlying principle of the tag is that the integral locking bar is sufficiently fine and delicate that it will tend to break when the tag is tampered with as it is only possible to gain access to the locking tongue from one side of the strip. However, recently it has been found that with some care and by the use of a specially formed fine instrument, it is possible to grip the locking bar in such a way as to reinforce it temporarily, which then makes it possible to unclinch the tongue without breaking the locking bar. As a result, therefore, it is possible in some instances to tamper with the tag so that tags might be changed for false marking purposes, interchanging the tag of one animal to another, as, for instance, changing the tag of a dead animal to a live one to represent the latter other than it is.

The present invention is based on this prior patent and employs its particularly good points, namely, the housing and integral locking bar, but modifies the locking tongue so that in combination with this housing, when the tag is clinched, the locking bar is so enclosed or so obstructed that it is not possible, even with specially formed fine tools above mentioned, to grasp or support the locking bar; whereas, in addition, the tongue is weakened in this special construction so that it will tend also to break.

According to the invention, I provide a tag formed from a strip of material adapted to be bent on itself and formed with a tapered locking tongue at one end and with a housing for receiving the locking tongue at the other, and having an opening accessible from one side of the strip with an integral locking bar extending across the opening around which the locking tongue extends when the tag has been clinched, the tongue intermediate its length being offset and weakened, the offset portion when clinched, forming an apron designed to overlie the locking bar and substantially enclose it on the open accessible side of the housing.

Preferably, the tongue is provided with a boss adjacent its tip designed to facilitate the curling of the tongue within the housing during the clinching operation and preferably also, the tongue is formed adjacent its free extremity with a plurality of weakened notches or cuts to facilitate the deformation of the tongue in the housing during the clinching operation.

The invention will be clearly understood by reference to the following detailed specification taken in conjunction with the accompanying drawings.

In the drawings:

Figure 1 is a perspective view of a tag according to the present invention before it is clinched;

Figure 2 is a side elevation of the tag when clinched;

Figure 3 is an enlarged fragmentary sectional view of the clinched tag to show more clearly the manner in which the locking tongue cooperates with the housing and locking bar; and Figure 4 is a section taken on the line 4—4 of Figure 3 to show the manner in which the locking bar is enclosed or covered on the open side of a housing.

Referring to the drawings, A indicates the tag as a whole formed from a single strip of material 10 bent upon itself in a manner to provide a locking tongue B and died at the opposite end to form a housing C open on that side of the strip facing the tongue B and provided with an integral locking bar 11. The housing C and locking bar 11 are formed by dieing the strip in such a manner that the locking bar 11 is left in the plane of the strip and integral therewith and the two sections of the housing 12 and 13 which are depressed from the strip are at the same time forced to abut one another as at 14, thus forming a housing which is completely closed on one side but provides the accessible opening 15 on the opposite side to provide a target for the locking tongue and permit the locking tongue to clinch around the locking bar 11 when the tag is clinched.

The locking tongue B is tapered substantially to a point and is crimped or offset intermediate its ends as at 16 by bending it transversely of itself in three spaced apart spaces to form a compound projection D comprised of two sections inclined to one another, one substantially overlying the other, and both projecting laterally from the main axial plane of the tongue inwardly and substantially overlapping the axial line of said locking bar of the housing. When the tag is clinched, the two sections of this projection will tend to bend further, particularly at their point of junction, as the free end of the tongue is deformed by the housing and curls around the locking bar.

Thus, as shown in Figure 3, the offset or crimped portion of the tongue which folds upon itself, forms itself into a laterally projecting apron or covering D which overlies the locking bar 11 substantially throughout its length (see Figure 4) and therefore substantially encloses the locking bar on the open side of the housing. As a result of this, it is impossible for one to insert even a specially designed fine tool to reinforce the locking bar while trying to tamper with the clinched tongue to open the tag.

The tag may be particularly weakened at one end of the offset or clinched portion such as at 17 and/or weakened at other points so that any tampering will result in the breaking of the tongue if not the locking bar as well.

Preferably, the tongue adjacent its free extremity is provided with a plurality of notches, or cuts 18 on its inner face to facilitate curling of the tongue around the locking bar during clinching operation and particularly in the case where harder materials are used than the average, although it may be found desirable to weaken this portion of the tongue in this manner as a normal course.

Preferably also, the tag is provided with an outwardly projecting tapered boss 19 which, when it contacts with the inner face of the housing during the clinching operation, will tend to facilitate complete curling of the tongue so that, when clinched, the point of the tongue will substantially meet the folded end of the offset or crimped portion 16 of the tag which finally forms the apron or cover D.

The present construction completely avoids the instances of tampering which were possible with special instruments in respect to the old tag, but provides a tag which can be produced at substantially the same cost.

What I claim as my invention is:

1. An ear tag comprising: a strip of material, adapted to be bent upon itself, formed at one end with a housing closed on one side of the strip and having an accessible opening on the other, a locking bar integral at each end with the strip and extending transversely across the opening to the housing, the opposite end of the strip having a locking tongue substantially at right angles to the strip, formed with a free tapered end to enter said housing and deformable to clinch around said locking bar when the tag is clinched, said tongue being crimped intermediate its ends by bending it transversely of itself in three spaced apart locations to form a compound projection defined by two sections substantially inclined to one another, one substantially overlying the other and both projecting laterally from the main axial plane of the tongue, inwardly and substantially overlapping the axial line of said locking bar of the housing, the sections of said lateral projection being bendable towards one another when the tag is clinched to form an apron, said apron being disposed directly adjacent to, and overlapping and substantially covering the locking bar, when said deformable free end is caused to enter said housing and clinch said locking bar.

2. An ear tag as claimed in claim 1, in which the compound lateral projection of said tongue is weakened substantially along at least one location of the three transverse bends.

3. An ear tag as claimed in claim 1, in which the tongue is weakened adjacent its free end to facilitate deformation, and is provided with a boss projecting from its outer surface spaced inwardly of its free end, designed to engage the inner surface of the housing to facilitate complete clinching of the tongue when the tag is clinched.

4. In an ear tag of the class formed from a strip of material bent upon itself and formed at one end with a housing that is closed on one side and has an accessible opening on the other, the said opening having a locking bar integral at each end with the strip and extending transversely across the said opening, the said strip being formed at its opposite end with a locking tongue substantially at right angles to the strip, the said locking tongue having a tapered end for deformation as it enters the said housing and being adapted to clinch around the said locking bar; the improvement of forming said tongue with a crimped section intermediate its ends adjacent the tapered deformable end thereof, said crimped section defining a lateral projection disposed inwardly from the plane of the tongue substantially overlapping the axial line of the locking bar of the housing, said projection being disposed directly adjacent to, overlapping and substantially covering, the locking bar when said deformable free end is caused to enter said housing and clinch said locking bar.

ERNEST WARD ASHTON.

References Cited in the file of this patent

UNITED STATES PATENTS

| Number | Name | Date |
|---|---|---|
| 1,851,000 | Berntson | Mar. 29, 1932 |
| 2,149,411 | Ashton | Mar. 7, 1939 |
| 2,309,030 | Wittlinger | Jan. 19, 1943 |

FOREIGN PATENTS

| Number | Country | Date |
|---|---|---|
| 77,001 | Austria | June 6, 1919 |